United States Patent [19]

Dycus et al.

[11] 3,827,497

[45] Aug. 6, 1974

[54] OIL RECOVERY PROCESS USING AQUEOUS SURFACTANT COMPOSITIONS

[75] Inventors: Dale W. Dycus; Earl W. Malmberg; Harry L. Wilchester, all of Dallas, Tex.

[73] Assignee: Sun Oil Company, Dallas, Tex.

[22] Filed: Feb. 1, 1973

[21] Appl. No.: 328,813

[52] U.S. Cl. ............. 166/274, 252/8.55 D, 166/275
[51] Int. Cl. ............................................. E21b 43/22
[58] Field of Search ......................... 166/273–275, 166/252, 305 R; 252/8.55 D, 8.5 A, 8.5 C

[56] References Cited
UNITED STATES PATENTS

| | | | |
|---|---|---|---|
| 3,308,068 | 3/1967 | Jones | 252/8.5 |
| 3,508,612 | 4/1970 | Reisberg et al. | 166/275 X |
| 3,605,891 | 9/1971 | Ayers, Jr. | 166/273 |
| 3,637,017 | 1/1972 | Gale et al. | 166/273 X |
| 3,638,728 | 2/1972 | Hill | 166/273 |
| 3,712,377 | 1/1973 | Hill et al. | 166/252 |
| 3,769,209 | 10/1973 | Holm | 252/8.55 D |

*Primary Examiner*—Stephen J. Novosad
*Attorney, Agent, or Firm*—Mr. George L. Church; Mr. J. Edward Hess

[57] ABSTRACT

A surfactant composition useful in recovering oil by waterflooding with brine comprises a mixture of an organic sulfonate surfactant, a sulfated or sulfonated oxyalkylated alcohol and a polyalkylene glycol alkyl ether.

11 Claims, No Drawings

OIL RECOVERY PROCESS USING AQUEOUS SURFACTANT COMPOSITIONS

BACKGROUND OF THE INVENTION

Waterflooding is a well-known technique for the secondary or tertiary recovery of oil from subterranean formations from which oil has previously been recovered by primary techniques such as pumping, natural flow and the like. In many areas the only economic source of water is a brine and the brine usually contains various metal ions such as calcium, magnesium and the like. As used herein brine means a sodium chloride brine.

The use of surfactants to reduce the interfacial tension between the water and the oil to be displaced from the formation is also well known and the literature is replete with different surfactants and combinations thereof useful in waterflooding processes. It is well known that the effectiveness of any given surfactant material varies considerably with such factors as temperature of the water, the amount of salt in the water, the amount and type of metal ions in the water and the like.

U.S. Pat. Nos. 3,508,612, Reisberg et al., Apr. 28, 1970 and 3,308,068, Jones, Mar. 7, 1967, each disclose surfactant compositions useful in waterflooding operations. The composition of the first-mentioned patent is a two-component mixture exemplified by a petroleum sulfonate and a salt of a sulfated polyethoxylated alcohol. The composition of the latter patent is a two-component mixture exemplified by a petroleum sulfonate and hexyl carbitol (diethylene glycol monohexyl ether). These compositions have been used commercially but have certain limitations which preclude their use in certain applications.

Both compositions have limitations related to flooding with brine, i.e., with saline solutions. The carbitol-sulfonate composition is unstable in brines containing more than about 0.5–1.0 percent salt, the exact amount depending somewhat on other factors such as metal ion content of the brine, temperature, and the like. Instability is evidenced by the surfactant mixture separating into a separate distinct phase from the saline solution. Also, even if the surfactant composition is made up with fresh water and injected into the reservoir in that form, the composition often encounters brine in the reservoir which causes phase separation.

The sulfonate-salt of a sulfated oxyalkylated alcohol mixture of U.S. Pat. No. 3,508,612 has improved brine tolerance in that it is useful in, say, 5 percent brine but the ratio of the two ingredients in this composition is very sensitive to the brine content. For example, 5 percent petroleum sulfonate and 2 percent of the sulfated polyethoxylated alcohol (sodium salt) in a 5 percent brine containing 0.1 percent calcium is stable whereas a solution the same in all respects but containing 3 percent of the alcohol is unstable. This sensitivity is extremely important because in commercial operations the brine strength may vary from time to time or because the concentration of the surfactant composition will vary slightly as it moves through the formation because of in-situ water, non-uniform movement and the like.

The carbitol composition also has the disadvantage that it is not effective at temperatures above about 65°C, i.e., its temperature resistance is not always satisfactory. The composition of U.S. Pat. No. 3,508,612 does not possess this disadvantage but it has another disadvantage when polymers are also added to the water. This use of polymers is a well-known technique to improve the mobility of the water. The polymer increases the viscosity of the water and thereby improves the movement of the waterflood through the formation as a single front reducing channeling of the water through areas of the formation of greater porosity. Unfortunately when the sulfonate-sulfated polyethoxylated alcohol combination is used with water or brine containing polysaccharides as a mobility (i.e., viscosity) improver, plugging of the formation often occurs. The reason for the plugging is not precisely understood but most likely involves a flocculation of the polymer from the flooding agent.

SUMMARY OF THE INVENTION

The present invention relates to an improved three-component surfactant composition for waterflooding recovery processes, and to waterflooding processes utilizing same. The composition has good brine stability in that it is stable over a wide range of salt concentrations and, in addition, can be used with polysaccharide mobility improvers without plugging of the formation.

The composition contains three components; an organic sulfonate surfactant such as a petroleum sulfonate, a polyalkylene glycol alkyl ether, and a salt of a sulfonated or sulfated oxyalkylated alcohol. Surprisingly we have found that a combination of the compositions of the general type disclosed in the aforesaid two United States patents overcomes the aforementioned disadvantages of these compositions when employed individually.

Another embodiment of the invention is a two-component composition containing an organic sulfonate such as a petroleum sulfonate and a salt of a sulfonated oxyalkylated alcohol. This composition has much better hydrolytic stability at elevated temperatures than a composition the same except that the oxyalkylated alcohol is sulfated, the latter being as disclosed in the aforesaid U.S. Pat. No. 3,508,612.

DESCRIPTION OF THE INVENTION

The organic sulfonate component of the invention can by any of those widely available commercially under tradenames such as "Bryton Chemical F467," "Witco Chemical TRS-10," "American Cyanamid Aerosol OT" and many others. They are usually, and preferably, metal salts of alkylaryl sulfonates, preferably alkali metal salts of alkylbenzene sulfonates, containing 12–30 carbon atoms, but can also be sulfocarboxylate salts, aliphatic sulfonates, alkylated naphthalene sulfonates and the like, the essential requirement being that it have surfactant properties. The cationic portion can be ammonium or amine as well as metal but is usually sodium. The molecular weight of this organic sulfonate surfactant is usually in the range of 300–600, more frequently 350–525. These materials can be prepared by well-known procedures such as those described in U.S. Pat. No. 3,308,068. They can be prepared synthetically or can be those prepared from petroleum and commonly known as petroleum sulfonates.

The polyalkylene glycol monoalkyl ethers are widely available commercially. The alkylene group is usually ethylene but can be propylene or others up to about five carbon atoms. It can repeat itself up to about 10 times (i.e., the "poly" can be up to about 10) but usually repeats itself 2-6 times, more usually twice, e.g., diethylene. It should also be understood that for any specified polyalkylene, the number of alkylene units is either exactly as specified or varies but the average is as specified. This same principle applies also to the alkyl group. Preferably the glycol portion is diethylene glycol. The alkyl group will normally contain 2-12 carbon atoms, preferably 4-10. In general the more alkylene units or the longer the alkylene unit, the longer the alkyl group should be. The preferred component is diethylene glycol hexyl ether. These materials are available commercially or can be made by known procedures.

The sulfated or sulfonated oxyalkylated alcohols can be made by known procedures from oxyalkylated alcohol surfactants. The alcohol portion is usually derived from aliphatic alcohols of 8-20 carbon atoms, usually a primary alcohol, but other alcohols such as secondary aliphatics, alkyl phenols containing 5-20 carbon atoms per alkyl group and the like are suitable. The oxyalkyl portion is usually dervied from ethylene oxide but other lower alkylene oxides containing 2-6 carbon atoms or mixtures thereof are suitable, e.g. propylene oxide. The oxyalkyl portion is usually polyoxyalkyl, the radical repeating itself 2-15 times, thus yielding a material of the formula $$RO - (R'O)_x - H$$

where RO- is the alcoholic portion and R'O is the oxyalkyl portion and $x$ is 2-15, preferably 2-8. The oxyalkylated alcohol may contain substituents such as hydroxyl or amine groups and the like on either the alcohol moiety or the oxyalkyl portion.

The oxyalkylated alcohols can be sulfated by conventional procedures with sulfuric acid and then neutralized to form metal, ammonium or amine salts. Such salts are widely available commercially. The sulfate can also be converted to the sulfonate by known procedures such as by reaction with sodium sulfite at elevated temperature, e.g. 170°C for about 8 hours.

The above components are combined to make a surfactant composition of the invention. In flooding operations a surfactant-brine mixture is usually injected into the formation as a slug which is then driven through the formation as a front by additional brine which may contain a mobility improver. The slug of surfactant is usually about 10 percent of the pore volume of the formation and typically has the following amounts of the above-described ingredients:

| 1. | Surfactant salt of organic sulfonate | 0.5-15% preferably 2-10% |
| 2. | Polyalkylene glycol alkyl ether | 0.25-10% preferably 1-8% |
| 3. | Salt of sulfated or sulfonated oxyalkylated alcohol | 0.25-10% preferably 1-8% |

The above percentages are by weight with the balance being the brine portion of the slug which will usually contain 0.5-8 percent NaCl although the present invention appears to be most suitable with brines under about 6 percent NaCl. The brine will often contain 50-5,000 ppm polyvalent metal ions such as $Ca^{++}$ and/or $Mg^{++}$.

The ratio of components 2 and 3 above will vary. In general as the brine concentration increases the ratio of the salt of sulfated or sulfonated oxyalkylated alcohol to the polyalkylene glycol alkyl ether increases. This ratio also tends to increase as the metal ions in the brine increase. The total amount of components 1, 2 and 3 in a slug above will usually be in the range of 1-20 percent, more frequently 2-12 percent.

As noted previously the salt of sulfonated oxyalkylated alcohol combined with the organic sulfonate salt has improved hydrolytic stability at elevated temperatures over a combination the same except that the alcohol material is sulfated rather than sulfonated. The sulfated combination is disclosed in U.S. Pat. No. 3,508,612. This embodiment of the present invention will contain 0.5-15 parts, preferably 1-8 parts by weight of each of the two ingredients, and is useful as an additive for flooding water although it is generally not as effective, particularly in brine, as the three-component surfactant composition of the invention. The composition made up as a slug will thus contain 0.5-15 percent, preferably 1-8 percent of each of the ingredients, the balance being the brine.

A series of tests were conducted to show the improved performance of the compositions of the invention over known compositions containing some but not all of the ingredients. These tests are designed to show stability in brines and stability in the presence of polymers used as mobility improvers.

EXAMPLE I

A series of solutions were prepared to determine their stability. Stability was measured by allowing the solutions to stand for 24 hours and then observing whether they remained in one phase (stable) or had separated into two phases (unstable). The solutions were prepared by vigorously mixing the ingredients until a single phase was formed.

Varying amounts of "Neodol 25-3S" were added to a 5 percent brine containing 0.1 percent $Ca^{++}$ and to a 2 percent brine containing 0.02 percent $Ca^{++}$. In each case a petroleum sulfonate of the designated molecular weight was included in the amount of 5 percent based on the total composition. The stability results are as shown below. "Neodol 25-3S" is a commercial sodium salt of a sulfated oxyalkylated alcohol having the composition $$C_{12}-C_{15}O(CH_2CH_2O)_nSO_3-Na^+$$

with the average value of $n$ being 3.

| Percent "Neodol 25-3S" as listed, 5% petroleum sulfonate ("Witco TRS-16", molecular weight 455, Na salt alkylbenzene sulfonate), balance 5% brine (0.1% $Ca^{++}$) | Stability after 24 hours |
|---|---|
| 2% | unstable |
| 3% | slightly unstable |
| 4% | stable |
| 5% | unstable |

| Percent "Neodol 25-3S" as listed, 5% petroleum sulfonate ("Witco TRS-10", molecular weight 425, Na salt alkylbenzene sulfonate), balance 5% brine (0.1% $Ca^{++}$) | Stability after 24 hours |
|---|---|
| 1% | unstable |
| 2% | stable |
| 3% | unstable |

Percent "Neodol 25-3S" as listed,

Continued

| 5% petroleum sulfonate ("Witco TRS-10", molecular weight 425, Na salt alkylbenzene sulfonate), balance 2% brine (0.02% Ca$^{++}$) | Stability after 24 hours |
|---|---|
| 0.2% | unstable |
| 0.5% | stable |
| 0.8% | unstable |

The above data shows the sensitivity of the Neodol dispersion to its concentration in various brines; in other words to the brine composition to which it is added.

Attempts were made to formulate stable dispersions of hexyl carbitol in place of the Neodol in the above two brines, using hexyl carbitol concentrations of 1–5 percent and using 5 percent of the petroleum sulfonate as in the above tests. None of the attempts was successful.

Compositions were prepared containing both "Neodol 25–3S" and hexyl carbitol in the amounts listed in a brine containing 1,200 ppm Ca$^{++}$ and having the specified NaCl content. The brine contained 5 percent "Witco TRS-10" petroleum sulfonate (molecular weight 425). All percentages are based on the final composition. Tests were conducted at 23°C.

| % NaCl | % "Neodol 25-3S" | % Hexyl carbitol | Stability Test |
|---|---|---|---|
| 1.5 | 0.8 | 1.7 | Stable |
|  | 1.0 | 1.7 | do. |
|  | 1.1 | 1.8 | do. |
|  | 1.3 | 2.1 | do. |
| 3.0 | 1.0 | 1.3 | Stable |
|  | 1.3 | 1.6 | do. |
|  | 1.6 | 1.7 | do. |
| 4.5 | 1.2 | 0.9 | Stable |
|  | 1.5 | 1.1 | do. |
|  | 1.8 | 1.3 | do. |

The same tests were repeated at 70°C as follows:

| % NaCl | % "Neodol 25-3S" | % Hexyl carbitol | Stability Test |
|---|---|---|---|
| 1.4 | 0.7 | 1.6 | Stable |
|  | 1.0 | 1.9 | do. |
|  | 1.4 | 2.2 | do. |
| 3.0 | 1.1 | 1.2 | Stable |
|  | 1.3 | 1.5 | do. |
|  | 1.6 | 1.7 | do. |
| 5.0 | 0.7 | 1.3 | Stable |
|  | 0.9 | 1.5 | do. |
|  | 1.1 | 1.8 | do. |

These results show the lack of sensitivity of the three-component surfactant to brine concentration and temperature.

Another composition was made up at 23°C containing 2.5 percent of the petroleum sulfonate (TRS-10), 1 percent hexyl carbitol, 1.5 percent of the sodium salt of sulfated polyethoxylated nonyl phenol, containing 4 (on the average) ethoxy groups ("Retzolate 1075," Retzlaff Chemical Co.), the balance being 5 percent brine (1,200 ppm Ca$^{++}$. This composition was also stable.

A composition was prepared containing 1.4 percent "Neodol 25–3S," 0.9 percent hexyl carbitol, the balance being 2.9 percent brine having 1,200 ppm Ca$^{++}$. The solution was stable after 24 hours (70°C). The same composition was then made up again except that the NaCl content of the brine was varied from 1 percent to 4.2 percent in approximately 0.5 percent increments. All compositions were not only stable but birefringent down to about 1 percent NaCl. Below this level the solutions were clear but not birefringent; above about 4.2 percent the solutions separated into two distinct phases. Birefringency is a known characteristic of suitable surfactant slugs for flooding operations and the compositions of the invention exhibit this characteristic.

The tests described in the preceding paragraph show that the surfactants of this invention are suitable over a wide range of brine concentrations.

EXAMPLE II

Recovery in sandpacks was determined in a tube 5/8 inch diameter and 10 feet long filled with sand. Crude oil is introduced via a constant rate pump followed by a water flood until residual oil saturation is obtained. Next 0.1 pore volume of the surfactant composition is introduced followed by a brine solution containing 2 percent NaCl, 1,200 ppm Ca$^{++}$, 64 ppm Mg$^{++}$ and a polysaccharide mobility improver (Enjay Biopolymer).

The surfactant compositions were as follows:
1. 1% "Neodol 25–3S" and 2.5 percent "Witco TRS-10" petroleum sulfonate
2. 1.5% "Neodol 25–3S", 1 percent "2EO Hexanol," and 2.5 percent "Witco TRS-10" petroleum sulfonate "2EO Hexanol" is a commercially available (Witco Chemical) polyethylene glycol hexyl ether in which the number of ethylene groups (i.e., the poly) averages 2.

In the case of Composition 1 above no additional oil recovery was possible because the sandpack plugged almost immediately. In the case of Composition 2, 95 percent of the oil remaining in the sandpack was recovered. Similar tests over varying amounts of the ingredients specified in Compositions 1 and 2 above give the same results, i.e., without the hexyl carbitol (Composition 2) the Neodol system (Composition 1) usually plugs the sandpack. The hexyl carbitol was not tested alone because it cannot be added to brine to yield stable solutions.

The invention claimed is:
1. Method of recovering oil from a subterranean oil-bearing formation which comprises:
   A. injecting into the formation a saline solution containing a mixture of the following components:
      a. 0.5–15 percent by weight based on said solution of a surfactant salt of an organic sulfonate
      b. 0.25–10 percent by weight based on said solution of a polyalkylene glycol alkyl ether and
      c. 0.25–10 percent by weight based on said solution of a salt of a sulfonated or sulfated oxyalkylated alcohol
   in which the cationic portion of the salts of Components (a) and (c) is selected from the group consisting of alkali metal, amine and ammonium and

B. flooding the formation with a saline solution to effect oil recovery therefrom.

2. Method according to claim 1 wherein Component (a) is an alkali metal salt of a petroleum sulfonate containing 12–30 carbon atoms, Component (b) is diethylene glycol hexyl ether and Component (c) is an alkali metal salt of a sulfated polyethoxylated primary alcohol.

3. Method according to claim 2 wherein the amounts of Components (a), (b) and (c) respectively are 2–10 percent, and 1–8 percent.

4. Method according to claim 1 wherein the amounts of Components (a), (b) and (c) respectively are 2–10 percent, 1–8 percent and 1–8 percent.

5. Method according to claim 1 wherein the saline solution in Step (B) contains a polymer to improve the mobility thereof.

6. Method according to claim 5 wherein said polymer is a polysaccharide.

7. Method of recovering oil from a subterranean oil-bearing formation which comprises:

A. injecting into the formation a saline solution containing 1–20 percent by weight based on the solution of a mixture of:

a. a surfactant salt of an organic sulfonate
   b. a polyalkylene glycol alkyl ether and
   c. a salt of a sulfated or sulfonated oxyalkylated alcohol in which the cationic portion of the salts of Components (a) and (c) is selected from the group consisting of alkali metal, amine and ammonium and B. flooding the formation with a saline solution to effect oil recovery therefrom.

8. Method according to claim 7 wherein Component (a) is an alkali metal salt of a petroleum sulfonate containing 12–30 carbon atoms, Component (b) is diethylene glycol hexyl ether and Component (c) is an alkali metal salt of a sulfated polyethoxylated primary alcohol.

9. Method according to claim 7 wherein the amount of said mixture is 2–12 percent.

10. Method according to claim 7 wherein the saline solution in Step (B) contains a polymer to improve the mobility thereof.

11. Method according to claim 10 wherein said polymer is a polysaccharide.

* * * * *